US012390059B2

(12) United States Patent
Forbes

(10) Patent No.: US 12,390,059 B2
(45) Date of Patent: Aug. 19, 2025

(54) INTERACTIVE TRAINING TOILET

(71) Applicant: Ludlow Forbes, Elizabeth, NJ (US)

(72) Inventor: Ludlow Forbes, Elizabeth, NJ (US)

( * ) Notice: Subject to any disclaimer, the term of this patent is extended or adjusted under 35 U.S.C. 154(b) by 0 days.

(21) Appl. No.: 18/667,813

(22) Filed: May 17, 2024

(65) Prior Publication Data

US 2024/0298851 A1 Sep. 12, 2024

Related U.S. Application Data

(63) Continuation-in-part of application No. 17/810,558, filed on Jul. 1, 2022, now Pat. No. 12,011,123.

(60) Provisional application No. 63/218,138, filed on Jul. 2, 2021.

(51) Int. Cl.

| | |
|---|---|
| ***A47K 11/04*** | (2006.01) |
| ***A47K 13/24*** | (2006.01) |
| ***G09B 19/00*** | (2006.01) |

(52) U.S. Cl.

CPC .............. *A47K 11/04* (2013.01); *A47K 13/24* (2013.01); *G09B 19/0076* (2013.01)

(58) Field of Classification Search

CPC .......... A47K 11/04; A47K 11/06; Y10S 4/902
See application file for complete search history.

(56) References Cited

U.S. PATENT DOCUMENTS

| | | | | |
|---|---|---|---|---|
| 5,008,964 A | | 4/1991 | Dean | |
| 5,369,820 A | | 12/1994 | Blount | |
| 5,652,975 A | | 8/1997 | Hoskin | |
| 5,978,976 A | | 11/1999 | Chai | |
| 6,028,520 A | * | 2/2000 | Maehre | A47K 13/24 340/689 |
| 6,698,036 B2 | | 3/2004 | Armbruster | |
| 7,237,278 B1 | | 7/2007 | Scott | |
| 9,743,903 B1 | * | 8/2017 | Hall | A61B 5/6891 |
| 11,330,942 B1 | | 5/2022 | Bergman | |
| 11,607,089 B1 | | 3/2023 | Dove | |
| 2003/0066126 A1 | | 4/2003 | Armbruster | |
| 2016/0220079 A1 | | 8/2016 | Abir | |
| 2017/0198468 A1 | | 7/2017 | Hall | |
| 2017/0322197 A1 | | 11/2017 | Hall | |
| 2020/0040561 A1 | | 2/2020 | Sugawara | |
| 2022/0074918 A1 | | 3/2022 | Hall | |

FOREIGN PATENT DOCUMENTS

| | | | | |
|---|---|---|---|---|
| GB | 2618825 A | * | 11/2023 | G04G 5/002 |
| KR | 19990038722 A | * | 6/1999 | |

* cited by examiner

*Primary Examiner* — Erin Deery

(57) ABSTRACT

An interactive training toilet to aid in potty training a child. The training toilet has sensors to detect liquid waste, solid waste, and flatulence. The training toilet plays audio or video to relax and encourage the child. The training toilet records a timeline of bodily functions and sends a report to a connected application. One embodiment is an independent unit, and another embodiment attaches to a standard toilet.

17 Claims, 5 Drawing Sheets

100 104 106 107 101 102 103 105

INTERACTIVE TRAINING TOILET

FIELD OF THE INVENTION

The present invention relates generally to training toilets. More specifically, the present invention relates to training toilets with waste detection and feedback.

BACKGROUND OF THE INVENTION

Training toilets are used to train children how to use a toilet, i.e., "potty train" the child. A training toilet for a child is typically smaller than a standard toilet and is sized for a small child. Children with special needs may need additional training to use the toilet. Approximately 3 million children have down syndrome, Aspergers, or autism that makes potty training on a conventional toilet almost impossible. Many training toilets attach to a standard toilet and provide a smaller seat that is more comfortable for a child. Other training toilets are independent units with basins that must be emptied and cleaned by a caregiver.

It is an objective of the present invention to provide an interactive training toilet. The present invention also helps relax the child during the bathroom process, which also reduces tension or prevents the child becoming upset.

SUMMARY OF THE INVENTION

A training toilet for potty training children. The training toilet can be attached to a standard toilet, or the training toilet can be operated independently. The training toilet integrates sensors to detect a child using the toilet. The sensors detect different types of bodily waste. The training toilet provides feedback to the child based on what type of waste was detected. The training toilet plays audio cues to relax and encourage the child to use the toilet and reinforce good use of the toilet.

DETAILED DESCRIPTIONS OF THE INVENTION

All illustrations of the drawings are for the purpose of describing selected versions of the present invention and are not intended to limit the scope of the present invention.

The present invention is a training toilet. In one embodiment, the present invention is attached to a standard toilet. In another embodiment, the present invention is an independent unit. The present invention is a singing potty that sings a repetitive jingle with the words "Mama, I am a big boy. Now I can doodie in my potty and peepee in my potty." The present invention plays a light jingle that would relax the child and reduce tension for the child to prevent the child becoming upset during the process.

In one embodiment, the present invention connects to an application on a smartphone or home electronic system, controlled by the mother, father, or other caregiver. The app alerts the user that the child has urinated, defecated, or flatulated. The user can record a message to be played by the toilet to encourage the child. For example, the mother may record a message in a calm voice that says, "Very good, Kyle, you just peepeed and poopied in the potty."

In one embodiment, the present invention includes a video device. The video device allows a mother, father, or caregiver to communicate with the child. The video device also allows for playback of videos that instruct the child how to use the toilet or aid in relaxation of the child. For example, the video device may show a child sitting happily on the present invention.

In one embodiment, the present invention includes a video device. The video device allows for playback of videos that instruct the child how to use the toilet or aid in relaxation of the child. For example, the video device may show a child sitting happily on the present invention.

In one embodiment, the present invention includes an audio device. The audio device allows a mother, father, or caregiver to communicate with the child. The audio device also allows for playback of audio recordings that instruct the child how to use the toilet or aid in relaxation of the child.

In one embodiment, the present invention includes an audio device. The audio device also allows for playback of audio recordings that instruct the child how to use the toilet or aid in relaxation of the child.

Figure 1:
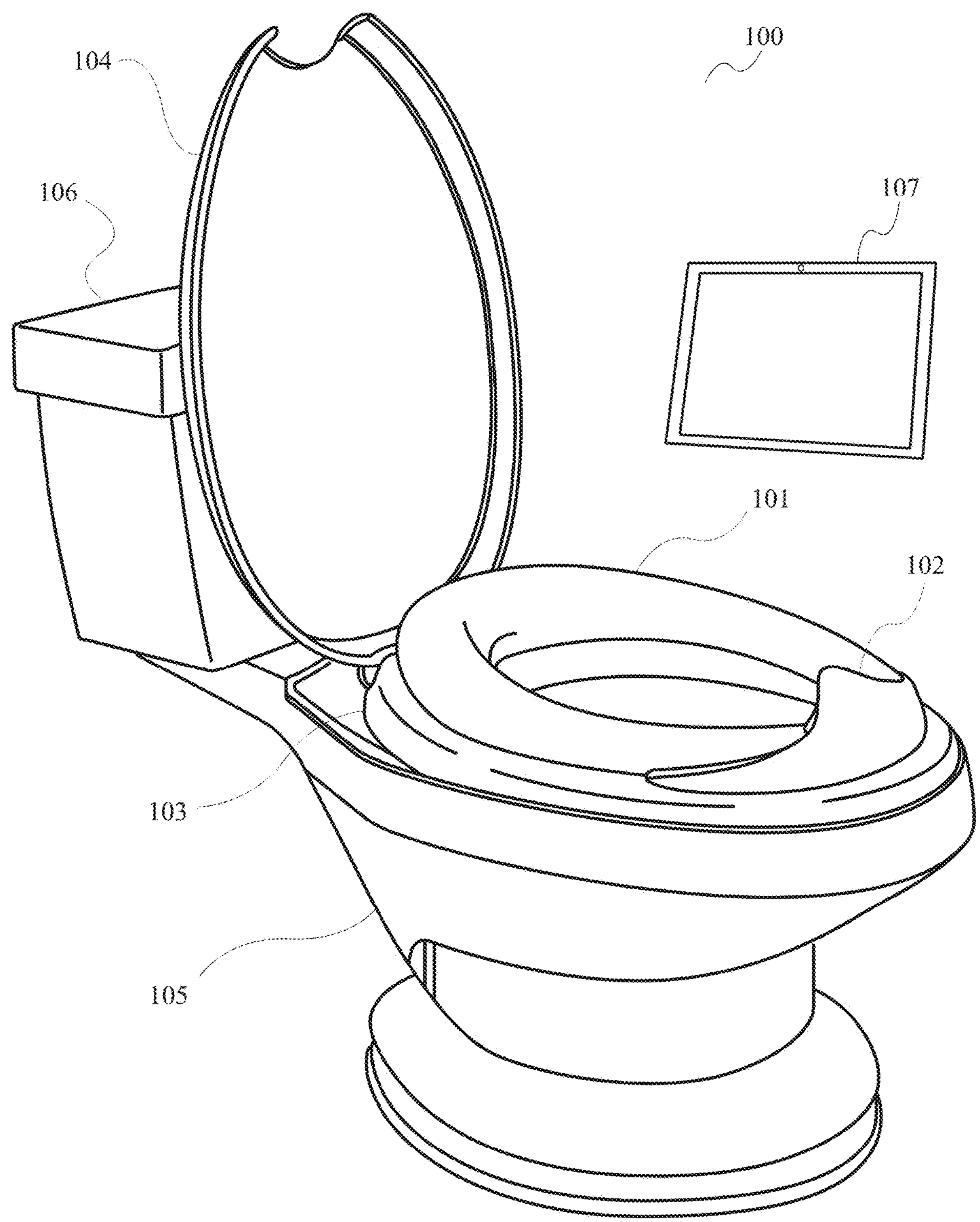
FIG. 1 is a perspective view of an embodiment of the present invention.

FIG. 1 is a perspective view of an embodiment of the present invention. In this embodiment, training toilet 100 comprises child seat 101, urinal cup 102, adult seat 103, lid 104, bowl 105, housing 106, and communication device 107. Child seat 101 is a smaller seat, sized to be used by a small child. In some embodiments, child seat 101 can be lifted to allow access to adult seat 103. Urinal cup 102 prevents a child, especially a male child, from urinating outside the toilet. In some embodiments, urinal cup 102 includes sensors to detect the presence of liquid waste. Lid 104 can be lowered to cover the opening when not in use. In this embodiment, lid 104 has a cutout to fit around urinal cup 102. Bowl 105 receives the waste. In some embodiments, bowl 105 is removable to empty the waste. In other embodiment, bowl 105 contains a removable basin to hold the waste. Housing 106 contains the electronics, while having the outer appearance of a flush tank for a toilet. For example, housing 106 may contain a computing device that receives data from sensors.

In one embodiment of the present intention, communication device 107 is a video device equipped with a video screen and a camera, enabling two-way video or two-way audio communication. In another embodiment, communication device 107 is an audio communication device. In one embodiment, communication device 107 is mounted to a wall adjacent to training toilet 100. For example, communication device 107 may be attached to an extending swivel mount, which is attached to the wall. In this example, communication device 107 is positioned in front of the child while in use and returned to the wall when not in use. In another embodiment, communication device 107 mounted to the base of toilet 100 with and extendable mount. For example, communication device 107 may be connected to an arm that moves upward and positions communication device 107 in front of the child. Communication device 107 allows a mother, father, or caregiver to communicate with the child. Communication device 107 also allows for playback of recordings that instruct the child how to use the toilet or aid in relaxation of the child. For example, communication device 107 may show a video of a child sitting happily on training toilet 100. In another example, communication device 107 may play audio instruction to instruct the child how to use the toilet.

In this embodiment, training toilet 100 is an independent unit with sensors built into bowl 105. The sensors include a sensitive lite scale that will detect the presence of the smallest amount of solid waste. For example, the solid waste sensor may be an accordion-type structure located inside bowl 105. In this example, the accordion-type structure will compress when solid waste falls on the structure, triggering the sensor to report the presence of solid waste. The sensors also include a sensor to detect the slightest amount of liquid waste. For example, the liquid waste sensor may be a capacitance sensor that detects the presence of liquid. In another example, the liquid waste sensor is a temperature sensor that detects a change in temperature cause by the presence of liquid waste. A channel to the sensor is slanted to ensure the liquid waste collects within range of the sensor. The sensors also include an audio sensor to detect flatulence. For example, the audio sensor may be a microphone located inside bowl 105. In this example, the audio sensor detects flatulence based on the proximity of the sensor to the child. Additionally in this example, the audio sensor is shielded from extraneous noises by bowl 105 and the body of the child. The sensors would make it easier for the child to identify these biological functions when he or she has them. The sensors are electronic and are powered by a rechargeable battery or wired into training toilet 100 to be charged.

Figure 2:
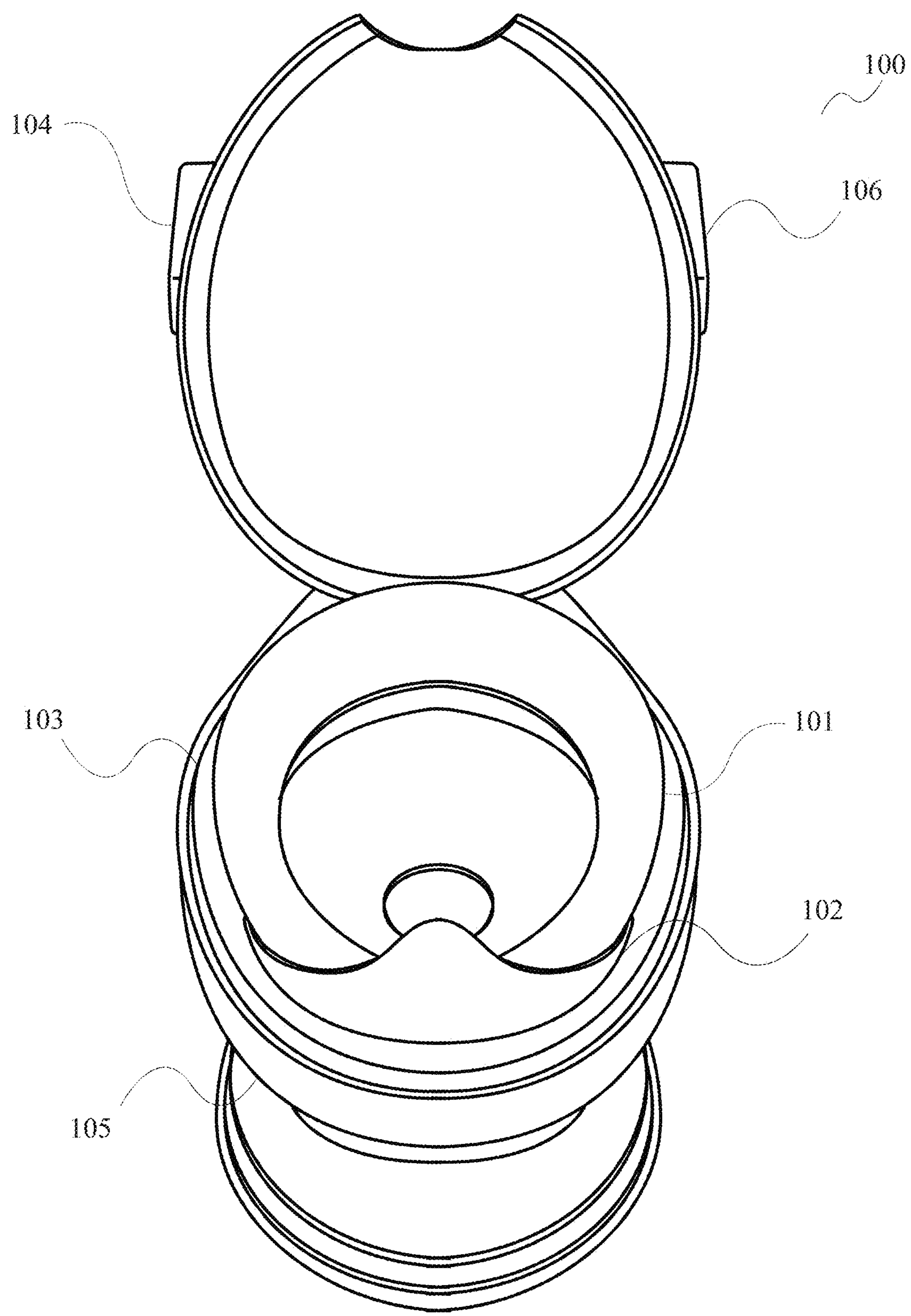
FIG. 2 is a perspective view of an embodiment of the present invention.

FIG. 2 is a perspective view of an embodiment of the present invention. In this embodiment, training toilet 100 comprises child seat 101, urinal cup, 102, adult seat 103, lid 104, bowl 105, and housing 106.

Figure 3:
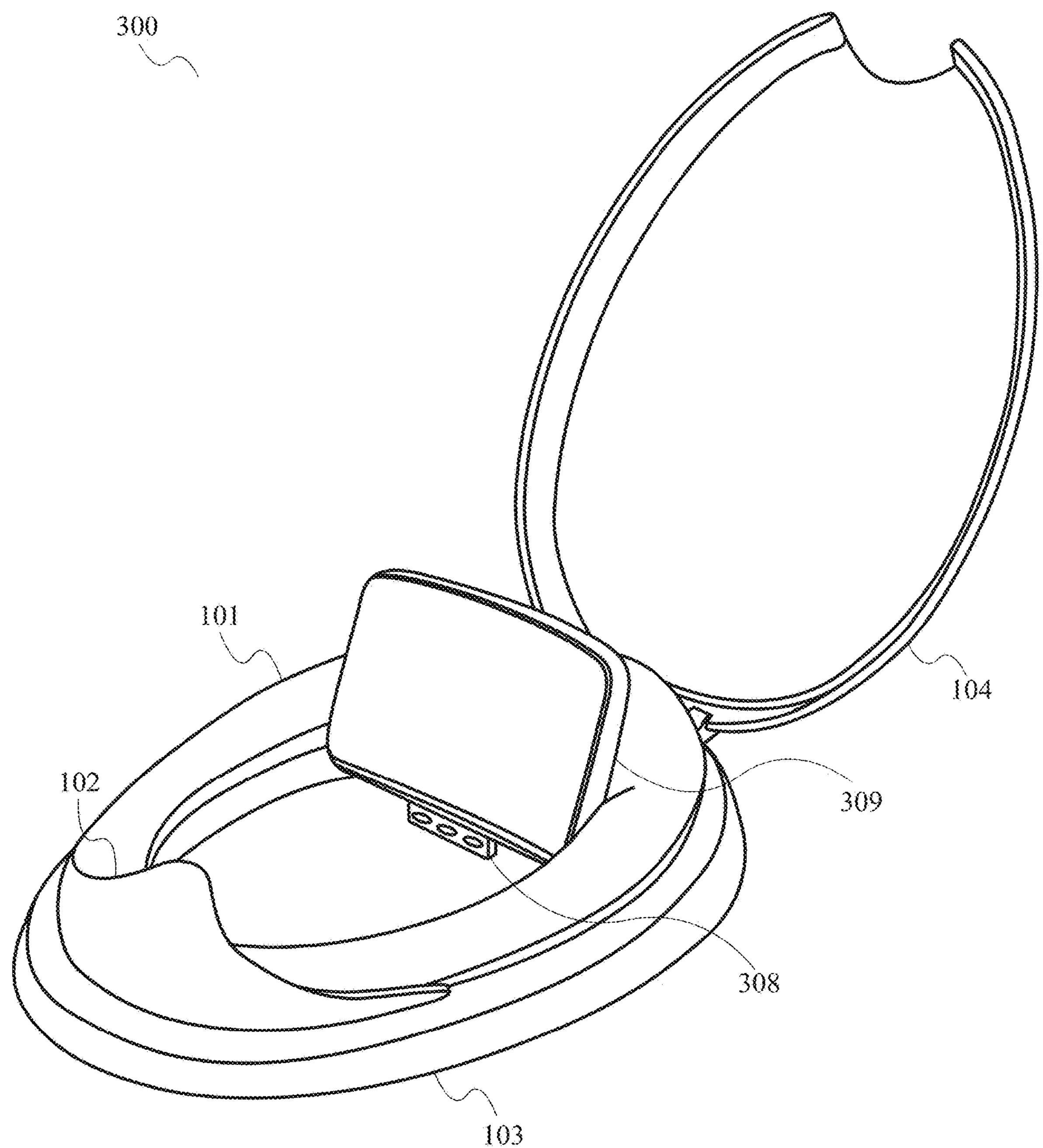
FIG. 3 is a perspective view of an embodiment of the present invention.

FIG. 3 is a perspective view of an embodiment of the present invention. Training toilet 300 comprises child seat 101, urinal cup 102, sensors 308, backrest 309, adult seat 103, and lid 104. Child seat 101 is a smaller seat, sized to be used by a small child. Backrest 309 is adjustable and aids in adjusting training toilet 300 to fit the child. Urinal cup 102 prevents a child, especially a male child, from urinating outside the toilet. In this embodiment, urinal cup 102 is collapsible to provide space for an adult to use the toilet. In some embodiments, urinal cup 102 includes sensors to detect the presence of liquid. Sensors 308 include a system of sensors to detect bodily function of the child. Sensors 308 are attached to the bottom of backrest 309 with screws or adhesive. Sensors 308 identify and detect the passing activities and the different properties between urination, defecation, and flatulence. Sensors 308 are electronic and are powered by a rechargeable battery or wired into training toilet 300 to be charged. In one embodiment, sensors 308 are attached with wires to a computing device located outside training toilet 100. For example, the computing device may be mounted to the standard toilet or to a wall. In another embodiment, the computing device may be located behind backrest 309, inside child seat 101 or adult seat 103.

Figure 4:
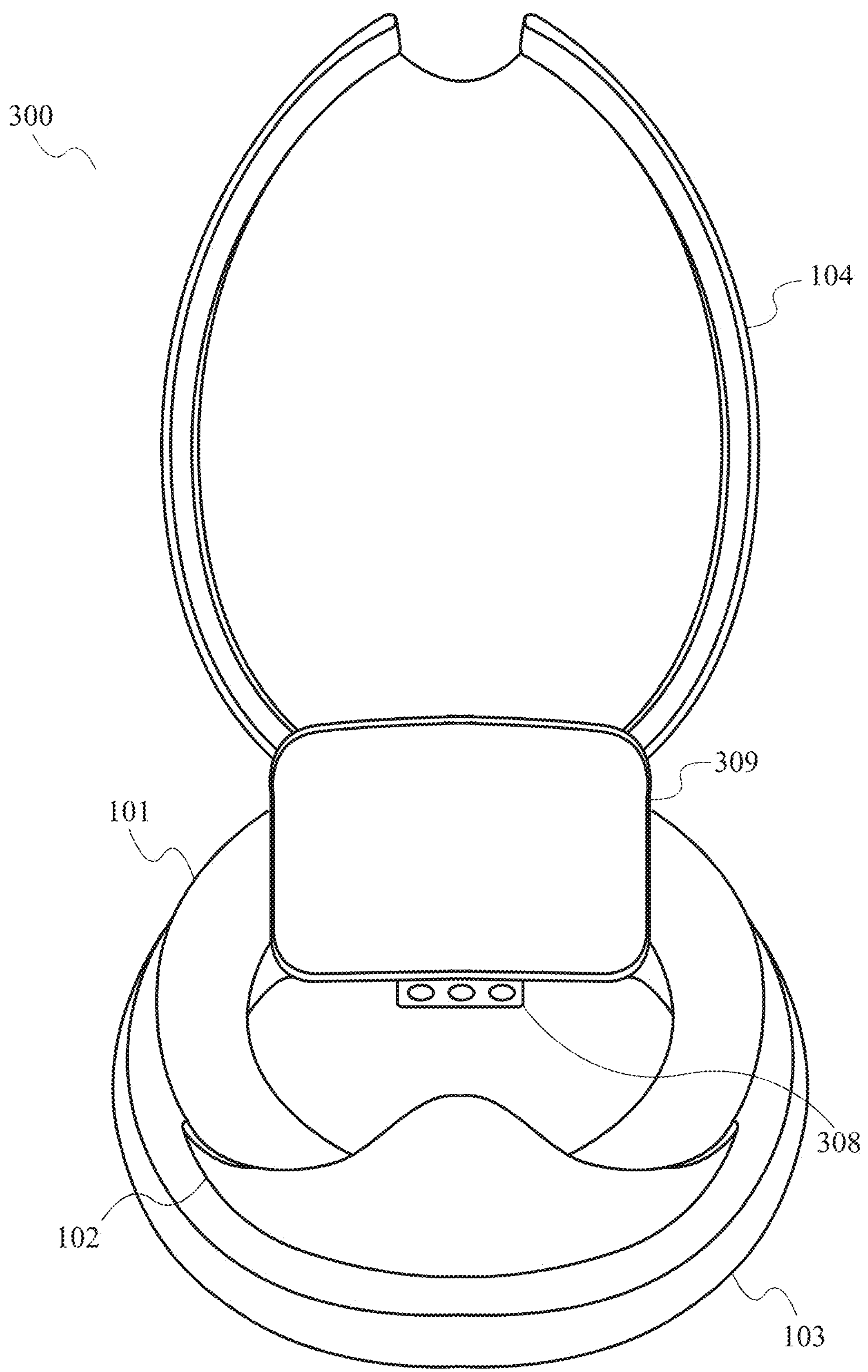
FIG. 4 is a perspective view of an embodiment of the present invention.

FIG. 4 is a perspective view of an embodiment of the present invention. In this embodiment, training toilet 300 comprises child seat 101, urinal cup 102, sensors 308, backrest 309, adult seat 103, and lid 104.

Training toilet 100 includes sensors to detect the positions of child seat 101, adult seat 103, and lid 104. When lid 104 is closed, training toilet 100 is inactive. When lid 104 and child seat 101 are both raised, training toilet 100 remains inactive. When lid 104 is raised while child seat 101 remains lowered, training toilet 100 activates. Training toilet 100 is also activated if child seat 101 is lowered from a raised position while lid 104 remains raised.

Figure 5:
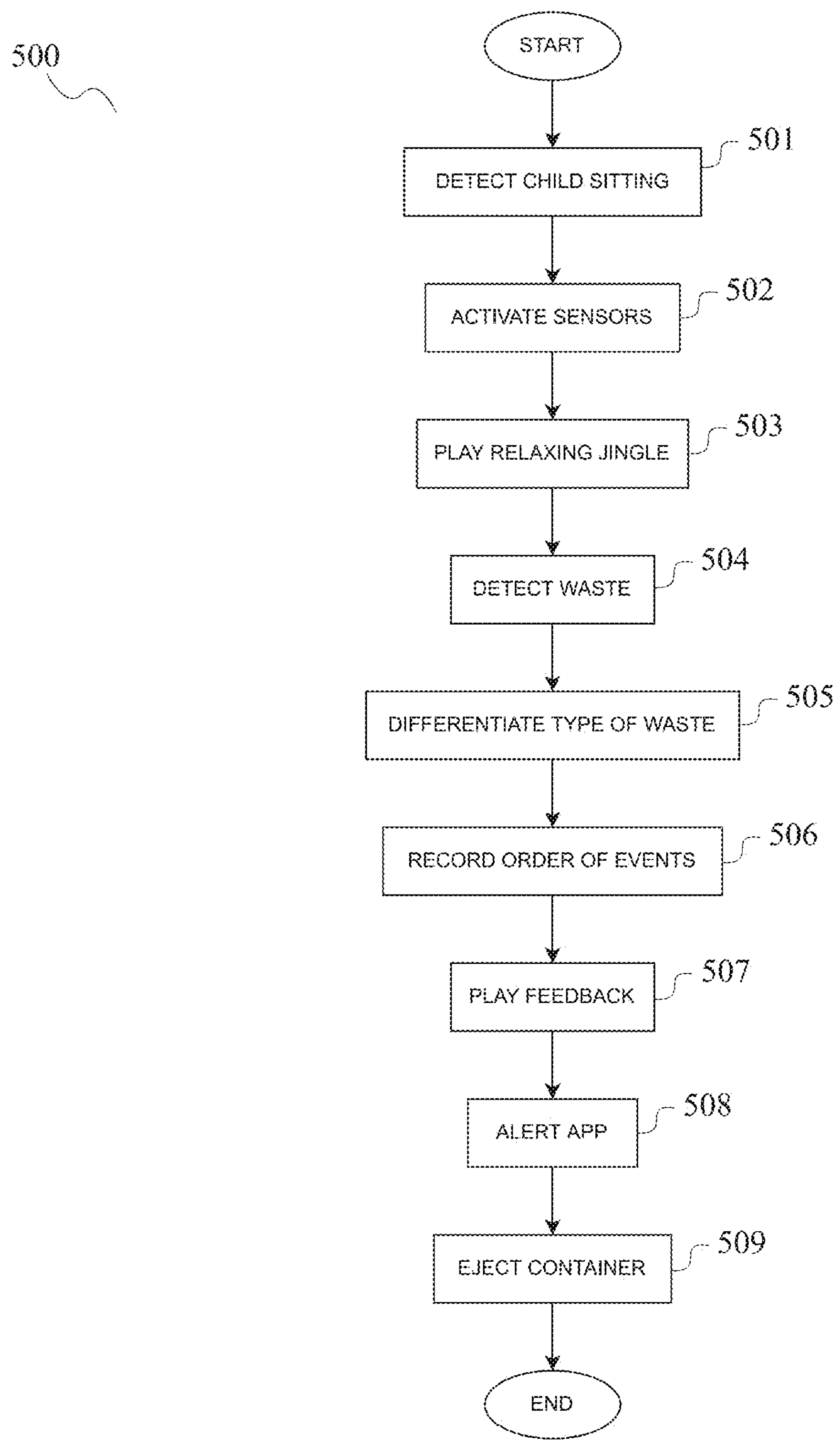
FIG. 5 is a flowchart of an embodiment of the present invention.

FIG. 5 is a flowchart of an embodiment of the present invention. Method 500 is a method for detecting use of a training toilet and providing feedback based on the use.

At step 501, the training toilet detects a child sitting on the toilet. For example, the training toilet may use a pressure sensor or scale to detect a child sitting on the toilet. In another example, if a maximum weight threshold is exceeded, the toilet may determine that something other than a child is sitting or has been placed on the toilet.

At step 502, the training toilet activates the sensors. In this embodiment, the training toilet prepares the sensors to start detecting bodily waste.

At step 503, the training toilet plays a relaxing jingle. In this embodiment, the training toilet plays a relaxing jingle to help the child become comfortable sitting on the toilet. For example, the training toilet may repeatedly play a jingle with the words, "Mama, I am a big boy now. I can doodie in my potty and peepee in my potty."

At step 504, the training toilet detects waste. In this embodiment, the training toilet has an array of sensors, including liquid, solid, and audio detectors. The training toilet detects the presence of liquid waste, solid waste, or the release of flatulence.

At step 505, the training toilet differentiate the types of waste. The training toilet differentiates the type of waste present based on which sensor detected the waste. For example, if the liquid sensor detects liquid, the training toilet determines that liquid waste is present.

At step 506, the training toilet records the order of events. In this embodiment, the training toilet records when the child sits on the toilet, when liquid waste is detected, when solid waste is detected, and when flatulence is detected. For example, the training toilet may record a timestamp when each event occurs.

At step 507, the training toilet plays feedback. In this embodiment, the training toilet plays a soothing jingle to encourage the child and reinforce good behavior. In some embodiments, the training toilet plays a general jingle. For example, the training toilet may play a jingle with the words, "Very good, Kyle. You just peepeed or doodied in the potty." In other embodiments, the training toilet plays a jingle based on the specific waste detected. For example, when liquid waste is detected, the training toilet may play a jingle with the words, "Very good, Kyle. You just peepeed in the toilet." In some embodiments, a pre-recorded message from the mother, father, or other caregiver is played.

At step 508, the training toilet alerts the app. In this embodiment, the training toilet sends an alert to a connected application controlled by the mother, father, or other caregiver of the child. For example, the training toilet may send an alert to an app installed on the smartphone of the mother with the text, "Kyle completed function 1 and function 2." In some embodiment, the training toilet includes the order of events in the alert. In some embodiments, the training toilet may wait for a period after the first event before reporting to monitor for additional events to include in the report.

At step 509, the training toilet ejects the inner container. In this embodiment, the training toilet ejects or dislodges an inner container holding the waste and discards the waste into the toilet. For example, a parent pulls a handle on the training toilet to eject the inner container, emptying the container into a standard toilet. The container is then cleaned and replaced in the training toilet.

Although method 500 has been explained in relation to the preferred embodiment, one skilled in the art will recognize that the steps may be performed in a different order and not all of the steps may be necessary to implement the method.

Although the invention has been explained in relation to its preferred embodiment, it is to be understood that many other possible modifications and variations can be made without departing from the spirit and scope of the invention as hereinafter claimed.

What is claimed is:

1. A training toilet, comprising:
a toilet seat;
a plurality of sensors, comprising:
a liquid waste sensor;
a solid waste sensor; and
a flatulence sensor, comprising an audio sensor configured for detecting flatulence;
a computing device;
a backrest;
wherein the backrest has an adjustable position, the adjustable position configurable to adjust a fit of the backrest;
wherein the computing device records an order of events, wherein the order of events includes a time associated with data received from the plurality of sensors;
wherein the computing device sends an alert to a connected application, wherein the alert includes the order of events;
a sensor configured to detect a position of the toilet seat; and
wherein the computing device is configured to activate the plurality of sensors responsive to detection of a raised position of the toilet seat.

2. The training toilet of claim 1, further comprising a communication device.

3. The training toilet of claim 2, wherein the communication device is configured for two-way communication.

4. The training toiled of claim 2, wherein the communication device is configured for playback.

5. The training toilet of claim 1, further comprising:
a urinal cup;
a second liquid waste sensor;
the urinal cup connected to the toilet seat; and
the second liquid waste sensor disposed within the urinal cup.

6. A training toilet, comprising:
a toilet seat;
a plurality of sensors, comprising:
a liquid waste sensor;
a solid waste sensor; and
a flatulence sensor, comprising an audio sensor configured for detecting flatulence;
a computing device;
a communication device;
a sensor configured to detect a position of the toilet seat;
wherein the computing device is configured to activate the plurality of sensors responsive to detection of a raised position of the toilet seat;
wherein the computing device records an order of events, wherein the order of events includes a time associated with data received from the plurality of sensors; and
wherein the computing device sends an alert to a connected application, wherein the alert includes the order of events.

7. The training toilet of claim 6, wherein the communication device is configured for two-way video communication.

8. The communication device of claim 6, wherein the communication device is configured for two-way audio communication.

9. The communication device of claim 6, wherein the communication device is configured for audio playback.

10. The training toilet of claim 2, wherein the communication device is configured for video playback.

11. The training toilet of claim 6, further comprising a backrest.

12. The training toilet of claim 6, further comprising:
a urinal cup;
a second liquid waste sensor;
the urinal cup connected to the toilet seat; and
the second liquid waste sensor disposed within the urinal cup.

13. A training toilet, comprising:
a toilet seat;
a plurality of sensors, comprising:
a liquid waste sensor;
a solid waste sensor; and
a flatulence sensor, comprising an audio sensor configured for detecting flatulence;
a computing device;
the computing device configured to record an order of events, wherein the order of events includes a time associated with data received from the plurality of sensors;
the computing device configured to send an alert to a connected application, wherein the alert includes the order of events;
a sensor configured to detect a position of the toilet seat; and
wherein the computing device is configured to activate the plurality of sensors responsive to detection of a raised position of the toilet seat.

14. The training toilet of claim 13, further comprising a communication device.

15. The training toilet of claim 14, wherein the communication device is configured for two-way communication.

16. The training toilet of claim 14, wherein the communication device is configured for playback.

17. The training toilet of claim 13, further comprising:
a urinal cup;
a second liquid waste sensor;
the urinal cup connected to the toilet seat; and
the second liquid waste sensor disposed within the urinal cup.

* * * * *